(12) United States Patent
Choi et al.

(10) Patent No.: US 12,516,398 B2
(45) Date of Patent: ***Jan. 6, 2026

(54) ALL-IN-ONE NICKEL RECOVERING METHOD FOR RECOVERY OF NICKEL OXIDE FROM RAW MATERIALS CONTAINING NICKEL

(71) Applicants: KOREA ZINC CO., LTD., Seoul (KR); KEMCO, Seoul (KR)

(72) Inventors: Heon Sik Choi, Ulsan (KR); Je Joong Lee, Seoul (KR)

(73) Assignees: KOREA ZINC CO., LTD, Seoul (KR); KEMCO, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/811,781

(22) Filed: Aug. 22, 2024

(65) Prior Publication Data

US 2025/0066876 A1 Feb. 27, 2025

Related U.S. Application Data

(63) Continuation of application No. PCT/KR2024/005240, filed on Apr. 18, 2024.

(30) Foreign Application Priority Data

Aug. 25, 2023 (KR) .................. 10-2023-0112131
Jan. 9, 2024 (KR) .................. 10-2024-0003684

(51) Int. Cl.
*C22B 23/02* (2006.01)
*C01G 53/04* (2006.01)
(Continued)

(52) U.S. Cl.
CPC .......... *C22B 23/0407* (2013.01); *C01G 53/04* (2013.01); *C22B 1/02* (2013.01);
(Continued)

(58) Field of Classification Search
CPC ......... C22B 23/0407; C22B 3/26; C22B 1/02; C22B 3/04; C22B 3/44; C22B 5/12;
(Continued)

(56) References Cited

U.S. PATENT DOCUMENTS 6,702,871 B1    3/2004   Fugleberg et al.
11,718,895 B2 *  8/2023  Ariyoshi .................. C22B 3/44
                                                          75/419

(Continued)

FOREIGN PATENT DOCUMENTS

AU   2019222783 B2   3/2020
CN   109110826 A     1/2019
(Continued)

OTHER PUBLICATIONS

Machine translation CN-111235384, Jun. 5, 2020 (Year: 2020).*
(Continued)

*Primary Examiner* — Coris Fung
(74) *Attorney, Agent, or Firm* — CANTOR COLBURN LLP

(57) ABSTRACT

A nickel recovering method includes: (A-i) a reduction heat treatment process for thermally treating a first raw material containing nickel and lithium; (B) a first leaching process for leaching the heat-treated product produced by the reduction heat treatment process; (A-ii) a first roasting process for thermally treating a second raw material containing nickel and sulfur; (C) a second leaching process for leaching the first leaching residue produced by the first leaching process and calcine produced by the first roasting process; (D) a neutralization process for neutralizing the second leachate produced by the second leaching process; (E) a purification process for removing impurities contained in the neutralized solution produced by the neutralization process; (F) a precipitation process for performing precipitation on the puri-
(Continued)

fied solution produced by the purification process; and (G) a second roasting process for roasting the precipitated residue produced by the precipitation process to recover nickel.

24 Claims, 1 Drawing Sheet

(51) Int. Cl.
  *C22B 1/02* (2006.01)
  *C22B 3/00* (2006.01)
  *C22B 3/04* (2006.01)
  *C22B 3/26* (2006.01)
  *C22B 3/44* (2006.01)
  *C22B 5/12* (2006.01)
  *C22B 26/12* (2006.01)
(52) U.S. Cl.
  CPC .............. *C22B 3/04* (2013.01); *C22B 3/26* (2021.05); *C22B 3/44* (2013.01); *C22B 5/12* (2013.01); *C22B 23/02* (2013.01); *C22B 23/0461* (2013.01); *C22B 26/12* (2013.01)
(58) Field of Classification Search
  CPC ..... C22B 23/02; C22B 23/0461; C22B 26/12; C01G 53/04
  USPC .......................................................... 75/419
  See application file for complete search history.

(56) References Cited

U.S. PATENT DOCUMENTS

| 11,926,882 | B1 | 3/2024 | Choi et al. |
|---|---|---|---|
| 2004/0159187 | A1 | 8/2004 | Hamalainen et al. |
| 2005/0211022 | A1 | 9/2005 | Roche et al. |
| 2013/0074653 | A1 | 3/2013 | Kobayashi et al. |
| 2019/0352740 | A1 | 11/2019 | Zhao et al. |
| 2020/0044295 | A1 | 2/2020 | Arakawa et al. |
| 2020/0376564 | A1 | 12/2020 | Heguri et al. |
| 2021/0324495 | A1 | 10/2021 | Rohde et al. |
| 2021/0354997 | A1 | 11/2021 | Osten et al. |
| 2022/0010407 | A1 | 1/2022 | Rohde et al. |
| 2023/0202863 | A1 | 6/2023 | Jeon et al. |
| 2023/0313337 | A1 | 10/2023 | Miyazaki et al. |
| 2024/0014457 | A1 | 1/2024 | Choi et al. |
| 2024/0051843 | A1 | 2/2024 | Liu et al. |
| 2024/0191322 | A1 | 6/2024 | Ryu et al. |
| 2024/0228311 | A1 | 7/2024 | Choi et al. |
| 2024/0240279 | A1 | 7/2024 | Choi et al. |

FOREIGN PATENT DOCUMENTS

| CN | 111235384 | A | * | 6/2020 | ........... C22B 23/023 |
|---|---|---|---|---|---|
| CN | 112400029 | A | | 2/2021 | |
| CN | 112646974 | A | | 4/2021 | |
| CN | 113321248 | A | | 8/2021 | |
| CN | 114959252 | A | | 8/2022 | |
| EA | 014105 | B1 | | 10/2010 | |
| EP | 3677695 | A1 | | 7/2020 | |
| EP | 3926061 | A1 | | 12/2021 | |
| JP | S5953638 | A | | 3/1984 | |
| JP | 2012031446 | A | | 2/2012 | |
| JP | 2015117152 | A | | 6/2015 | |
| JP | 2018088310 | A | | 6/2018 | |
| JP | 2019112661 | A | | 7/2019 | |
| JP | 2020180362 | A | | 11/2020 | |
| JP | 2021105206 | A | | 7/2021 | |
| JP | 2022509811 | A | | 1/2022 | |
| KR | 20200051925 | A | | 5/2020 | |
| KR | 20210075502 | A | | 6/2021 | |
| KR | 20210152270 | A | | 12/2021 | |
| KR | 102493104 | B1 | | 1/2023 | |
| KR | 102509344 | B1 | | 3/2023 | |
| KR | 102543371 | B1 | | 6/2023 | |
| KR | 20230107003 | A | | 7/2023 | |
| RU | 2236475 | C2 | | 9/2004 | |
| RU | 2287598 | C2 | | 11/2006 | |
| RU | 2568223 | C2 | | 11/2015 | |
| RU | 2596510 | C1 | | 9/2016 | |
| RU | 2618595 | C1 | | 5/2017 | |
| RU | 2621548 | C1 | | 6/2017 | |
| WO | 0056942 | A1 | | 9/2000 | |
| WO | 2007039663 | A1 | | 4/2007 | |
| WO | 2015009204 | A2 | | 1/2015 | |
| WO | 2019/045161 | A1 | | 3/2019 | |
| WO | 2020011765 | A1 | | 1/2020 | |
| WO | 2020166735 | A1 | | 8/2020 | |
| WO | WO-2021166755 | A1 | * | 8/2021 | ............... B22F 1/00 |
| WO | 2022050248 | A1 | | 3/2022 | |
| WO | 2023118037 | A1 | | 6/2023 | |

OTHER PUBLICATIONS

Agrawal et al, "A comprehensive review on the hydrometallurgical process for the production of nickel and copper powders by hydrogen reduction", Materials Research Bulletin, Oct. 2005, pp. 879-892.

International Search Report mailed Jul. 23, 2024 for PCT/KR2024/005240. In conformance with MPEP 609—Concise explanation of the relevance includes issue date of foreign OA and references cited therein.

ITS-12-2016 Nickel and cobalt production, Moscow, NTD Bureau, 2016.

Kolmachikhina, "Two-Stage Hydrochloride Leaching of Oxidized Nickel Ore From the Serovskoe Deposit," 2020, 6 pages.

V.V. Volynsky, "Methods for recycling nickel-cadmium batteries electrodes," Vestnik Saratovsky State Technological University, 2006, N3 (14), issue 1, p. 104-112.

U.S. Office Action for U.S. Appl. No. 18/811,796 mailed on Nov. 1, 2024.

U.S. Office Action for U.S. Appl. No. 18/811,784 mailed on Nov. 18, 2024.

U.S. Office Action for U.S. Appl. No. 18/811,789 mailed on Feb. 11, 2025.

U.S. Office Action for U.S. Appl. No. 18/811,789 mailed on Jun. 4, 2025.

Japanese Office Action for JP Application No. 2024-572188 mailed on Aug. 26, 2025.

Japanese Office Action for JP Application No. 2024-572190 mailed on Aug. 26, 2025.

Japanese Office Action for JP Application No. 2024-572191 mailed on Aug. 26, 2025.

Japanese Office Action for JP Application No. 2024-572193 mailed on Aug. 26, 2025.

Japanese Office Action for JP Application No. 2024-572195 mailed on Aug. 26, 2025.

U.S. Office Action for U.S. Appl. No. 18/811,789 mailed on Sep. 29, 2025 (25 Pages).

* cited by examiner

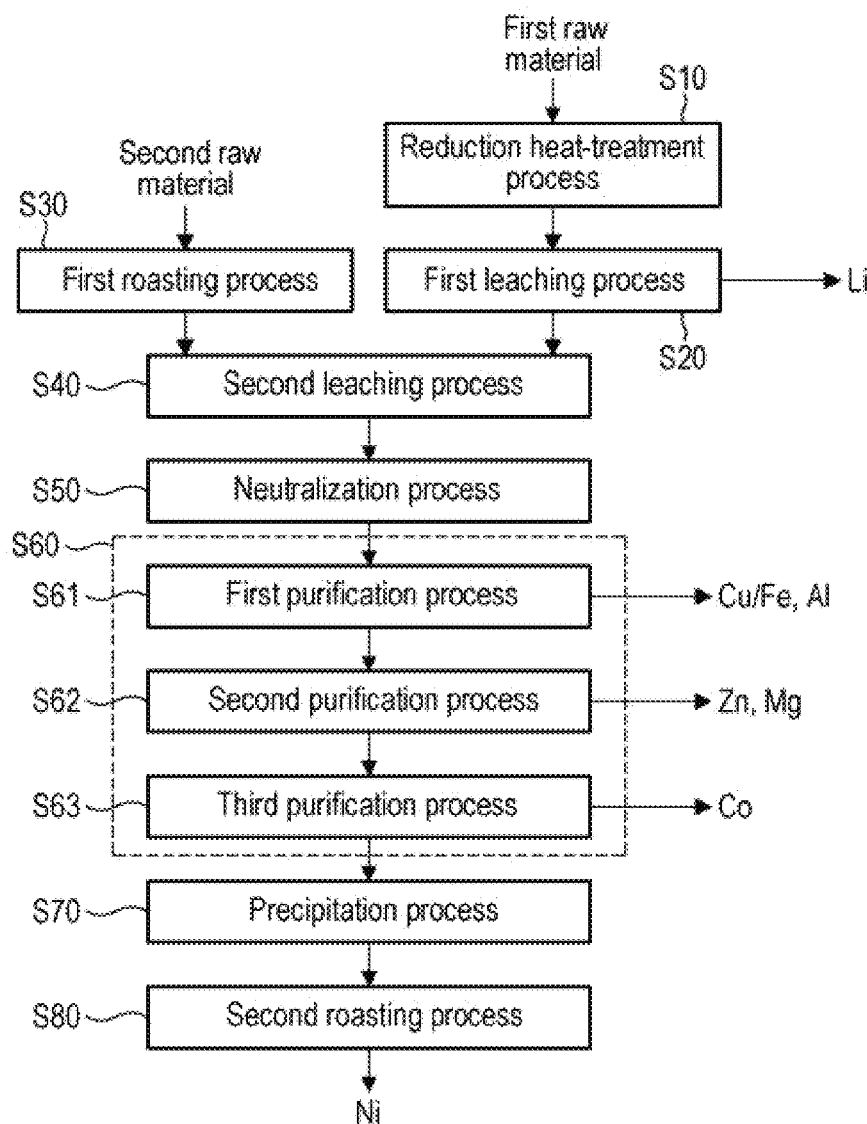

ALL-IN-ONE NICKEL RECOVERING METHOD FOR RECOVERY OF NICKEL OXIDE FROM RAW MATERIALS CONTAINING NICKEL

CROSS-REFERENCE TO RELATED APPLICATION

This application is a Continuation application of PCT International Application No. PCT/KR2024/005240, filed on Apr. 18, 2024, which claimed the benefit of Korean Patent Applications No. 10-2023-0112131 and No. 10-2024-0003684, filed on Aug. 25, 2023, and Jan. 9, 2024, respectively, the entire content of each of which is hereby incorporated by reference.

TECHNICAL FIELD

The present disclosure relates to a nickel recovering method and a method for producing a nickel solution using same. More specifically, the present disclosure relates to a method for recovering nickel from raw materials to recover high-purity nickel in a nickel oxide form.

BACKGROUND

Nickel can be recovered from various raw materials such as nickel metal, nickel matte, nickel concentrate, and nickel-containing process by-products. It is known that among various forms of recovered nickel, nickel sulfate is preferably contained in an amount of 99% or higher, with impurities amounting to a few hundred ppm or less, for ordinary cases.

Conventionally, such nickel sulfate was produced by preparing a high-purity nickel sulfate solution through leaching at atmospheric pressure with inorganic acids, neutralization with sodium hydroxide or sodium carbonate, and impurity removal, and then crystallizing the solution into nickel sulfate hexahydrate.

However, such conventional methods are disadvantageous in that there are a limited number of raw materials soluble to specific inorganic acids. In conventional methods, substances used as neutralizing agents (e.g., Na) are removed by washing with water after sludge filtration. This way of Na elimination increases the volume of wastewater and requires significant process time, resulting in lowering productivity and increasing wastewater treatment costs.

SUMMARY

An embodiment of the present disclosure is to provide an all-in-one process for recovering highly pure nickel from nickel-containing complex raw materials, which is a hybrid process combining pyrometallurgical and hydrometallurgical technologies, wherein even when various nickel-containing raw materials are applied, appropriate responses can be made, followed by appropriate subsequent processes to acquire nickel in desired forms.

Another embodiment of the present disclosure is to provide an environmentally friendly process that allows for the recycling of process by-products.

Also, the present disclosure aims to provide an economical and environmentally friendly nickel recovering process that allows for the selective isolation of lithium, the conversion of composite compounds into single compounds, and the recovery of inorganic acids from harmful gas through a pyrometallurgical pre-treatment and which is combined with a recycling hydrometallurgical process minimizing the influx of Na impurities, thereby enabling application to complex raw materials even in a single process.

Various embodiments of the present disclosure are related to a nickel recovering method comprising: (A-i) a reduction heat treatment process for thermally treating a first raw material containing nickel and lithium; (B) a first leaching process for leaching the heat-treated product produced by the reduction heat treatment process; (A-ii) a first roasting process for thermally treating a second raw material containing nickel and sulfur; (C) a second leaching process for leaching the first leaching residue produced by the first leaching process and calcine produced by the first roasting process; (D) a neutralization process for neutralizing the second leachate (leached solution) produced by the second leaching process; (E) a purification process for removing impurities contained in the neutralized solution produced by the neutralization process; (F) a precipitation process for performing precipitation on the purified solution produced by the purification process; and (G) a second roasting process for roasting the precipitated residue produced by the precipitation process to recover nickel.

In the nickel recovering method according to an embodiment of the present disclosure, the first and second raw materials may each independently include at least one selected from the group of an oxide, a hydroxide, a sulfide, and a sulfur oxide, the oxide, hydroxide, sulfide, and sulfur oxide each independently containing ore, matte, black mass (BM), black powder (BP), mixed hydroxide precipitate (MHP), mixed carbonate precipitate (MCP), mixed sulfide precipitate (MSP), or a mixture thereof.

In the nickel recovering method according to an embodiment of the present disclosure, the first raw material may comprise nickel in a form of nickel oxide or nickel metal composite oxide.

In the nickel recovering method according to an embodiment of the present disclosure, the second raw material may comprise nickel in a form of nickel sulfide.

In the nickel recovering method according to an embodiment of the present disclosure, the reduction heat-treatment process may be carried out at 650 to 950° C. in a manner of introducing the first raw material into a thermal treatment equipment and injecting nitrogen gas.

In the nickel recovering method according to an embodiment of the present disclosure, the first leaching process may be carried out using a first leaching agent including an inorganic acid, water, or a mixture thereof.

In the nickel recovering method according to an embodiment of the present disclosure, the first leachate obtained by the first leaching process may contain lithium and the first leaching residue may contain nickel.

In the nickel recovering method according to an embodiment of the present disclosure, the first roasting process may be carried out at 650 to 950° C. in a manner of introducing the second raw material into a thermal treatment equipment and injecting oxygen gas.

In the nickel recovering method according to an embodiment of the present disclosure, the first leaching residue and the calcine may be leached in an atmospheric reactor and a high-temperature, high-pressure reactor, respectively, in the second leaching process.

In the nickel recovering method according to an embodiment of the present disclosure, the second leaching process may be carried out using a second leaching agent including an inorganic acid, water or a mixture thereof.

In the nickel recovering method according to an embodiment of the present disclosure, the second leaching process may be carried out at a temperature of 150 to 250° C. under a pressure of 800 to 4300 kPa.

In the nickel recovering method according to an embodiment of the present disclosure, the second leaching process may be carried out in an environment with an acidity of 100 to 200 g/L.

In the nickel recovering method according to an embodiment of the present disclosure, the neutralizing process may be carried out using a neutralizing agent including MHP, MCP, nickel hydroxide ($Ni(OH)_2$), nickel carbonate ($NiCO_3$), sodium hydroxide (NaOH), sodium carbonate ($Na_2CO_3$), calcium hydroxide ($Ca(OH)_2$), magnesium hydroxide ($Mg(OH)_2$), calcium oxide (CaO), magnesium oxide (MgO), or a mixture thereof.

In the nickel recovering method according to an embodiment of the present disclosure, the neutralizing process may be carried out at 80° C. under conditions of a pH of 2 to 4.5.

In the nickel recovering method according to an embodiment of the present disclosure, the purification process may comprise: (E-i) a first purification process for removing impurities contained in the neutralized solution produced by the neutralization process; (E-ii) a second purification process for removing impurities contained in a first purified solution produced by the first purification process; and (E-iii) a third purification process for removing impurities contained in a second purified solution produced by the second purification process.

In the nickel recovering method according to an embodiment of the present disclosure, the first purification process may remove impurities including copper, iron, aluminum, silicon, zinc, cobalt, magnesium, or a combination thereof, using a precipitation method.

In the nickel recovering method according to an embodiment of the present disclosure, the first purification process may be carried out using (i) a sulfide precipitation process of adding a sulfide precipitating agent to the neutralized solution at a content of 1.0 to 2.5 equivalents of a copper content in the neutralized solution, (ii) a hydroxide precipitation process of adding a hydroxide precipitating agent to the neutralized solution at a content of 0.8 to 1.5 equivalents of an impurity content in the neutralized solution, or a combination of (i) and (ii).

In the nickel recovering method according to an embodiment of the present disclosure, the second purification process may remove impurities including zinc, magnesium, manganese, or a combination thereof, using a solvent extraction method.

In the nickel recovering method according to an embodiment of the present disclosure, the second purification process may be carried out using (i) a loading process of adding a first solvent extractant to the first purified solution to extract impurities including zinc, magnesium, or a combination thereof into an organic phase, and (ii) a stripping process of adding an inorganic acid to the organic phase to extract impurities including zinc, manganese, or a combination thereof, contained in the organic phase, into an aqueous phase.

In the nickel recovering method according to an embodiment of the present disclosure, the third purification process may remove impurities including cobalt, using a solvent extraction method.

In the nickel recovering method according to an embodiment of the present disclosure, the third purification process may comprise (i) a loading process of adding a second solvent extractant to the second purified solution to extract impurities including cobalt into an organic phase, and (ii) a stripping process of adding an inorganic acid to the organic phase to extract impurities including cobalt, contained in the organic phase, into an aqueous phase.

In the nickel recovering method according to an embodiment of the present disclosure, the precipitation process may be carried out using a precipitating agent including sodium hydroxide (NaOH), sodium carbonate ($Na_2CO_3$), calcium hydroxide ($Ca(OH)_2$), magnesium hydroxide ($Mg(OH)_2$), calcium oxide (CaO), magnesium oxide (MgO), or a mixture thereof.

In the nickel recovering method according to an embodiment of the present disclosure, the the precipitation process may be carried out at 85° C. in a condition of a pH of 6.5 to 10.0.

In the nickel recovering method according to an embodiment of the present disclosure, the second roasting process may be carried out at 350 to 800° C. in a manner of introducing the precipitated residue into a thermal treatment equipment and injecting oxygen gas.

According to the present disclosure, the reduction heat treatment process enables selective leaching and recovery of lithium from raw materials containing lithium, which forms strong chemical bonds, through thermal treatment.

According to the present disclosure, a first roasting process is utilized to transform various nickel-containing raw materials with various forms of chemical bonds into a single phase, ensuring uniformity in subsequent processes, whereby the process can be flexibly adapted to the rapidly changing nickel raw material market, contributing to the applicability of the entire process.

BRIEF DESCRIPTION OF THE DRAWINGS

The FIGURE is a diagram illustrating the entire processes for recovering nickel and manufacturing nickel oxide according to an embodiment of the present disclosure.

DETAILED DESCRIPTION

Embodiments of the present disclosure are illustrated for the purpose of explaining the technical idea of the present disclosure. The scope of the rights according to the present disclosure is not limited to the embodiments presented below or the detailed descriptions of such embodiments.

Herein, unless otherwise specified, "%" is understood to be based on weight.

Below, a description will be given of the present disclosure with reference to the drawing.

The FIGURE is a diagram showing the entire process for recovering nickel and manufacturing nickel oxide according to an embodiment of the present disclosure.

Referring to the FIGURE, a method for recovering nickel to a high purity through a series of processes, and for manufacturing nickel oxide using such smelted nickel, can be provided. This method can enhance versatility across various raw materials and products, operational stability, and purity, while reducing manufacturing costs. Hereinafter, each process will be described in detail with reference to the respective FIGURES.

Raw Materials

As starting materials, first and second raw materials each consist mainly of complex raw materials containing nickel. The starting materials may each independently include at least one selected from the group of oxides, hydroxides, sulfides, and sulfates. For example, these oxides, hydroxides, sulfides, and sulfates may independently include ore, matte, black mass (BM), black powder (BP), mixed hydroxide precipitate (MHP), mixed carbonate precipitate (MCP), mixed sulfide precipitate (MSP), or a mixture thereof.

For instance, the first raw material may include black mass (BM), black powder (BP), mixed hydroxide precipitate (MHP), mixed carbonate precipitate (MCP), or a mixture thereof. The first raw material may contain impurities such as iron (Fe), cobalt (Co), copper (Cu), zinc (Zn), magnesium (Mg), sodium (Na), silicon (Si), or a combination thereof, in addition to nickel (Ni) and lithium (Li). By way of example, the composition of the first raw material may be given as shown in Table 1. The first raw material may contain nickel in the form of nickel oxide (NiO) or a nickel metal composite oxide mixed with other metals.

TABLE 1

(unit wt %)

| | Ni | Li | Fe | Co | Cu | Zn | Mg | Al | Si | Mn |
|---|---|---|---|---|---|---|---|---|---|---|
| Content | 5-35 | 0.001-5 | 0.001-1.5 | 0.1-10 | 0.1-7 | 0.01-2.0 | 0.01-18 | 0.01-2.0 | 0.01-35 | 0.01-5.5 |

The second raw material may include ore, matte, mixed sulfide precipitates, or a mixture thereof. For instance, the second raw material may contain impurities such as iron (Fe), cobalt (Co), copper (Cu), zinc (Zn), magnesium (Mg), sodium (Na), silicon (Si), or a combination thereof, in addition to nickel (Ni) and sulfide(S). By way of example, the composition of the second raw material may be given as shown in Table 2. The second raw material may contain nickel in the form of nickel sulfide (NiS).

TABLE 2

(unit wt %)

| | Ni | Fe | Co | Cu | Zn | Mn | Mg | Al | Si |
|---|---|---|---|---|---|---|---|---|---|
| Content | 6-30 | 5-45 | 0.1-1.0 | 0.1-5.0 | 0.01-1.0 | 0.01-1.0 | 0.3-15 | 0.1-1.0 | 10-30 |

Reduction Heat Treatment Process (S10)

As a preprocessing step for the first raw material, a reduction heat treatment process (S10) can be performed.

In the reduction heat treatment process (S10), thermal treatment in a reducing atmosphere may be conducted on the first raw material containing nickel and lithium in the form of complex oxides that can bind with various metals. This treatment may cause a phase transition to oxides and/or carbonates, transforming lithium-containing compounds into substances with high solubility in water or inorganic acids.

As such, by converting the compound form of the first raw material containing lithium through the reduction heat treatment process (S10) before proceeding to the first leaching process (S20) for leaching/extraction of lithium described later, the leaching efficiency in the first leaching process (S20) for leaching/extraction of lithium can be improved.

For example, the reduction heat treatment process (S10) can be carried out using thermal treatment equipment such as an electric furnace (e.g., box furnace) or a rotary kiln.

According to an embodiment of the present disclosure, the reduction heat treatment process (S10) can be performed by introducing the first raw material into the thermal treatment equipment and injecting nitrogen gas, at a temperature of 650 to 950° C. For instance, a certain amount of the first raw material can be loaded into the thermal treatment equipment, and while injecting enough nitrogen gas ($N_2$ gas) to maintain a reducing atmosphere, reduction heat treatment can proceed at 650 to 950° C. In this process, not only lithium but also other metals can react, undergoing a phase transition through reactions according to [Reaction Formula 1]. Additionally, further reactions can occur through [Reaction Formula 2] and [Reaction Formula 3].

$9LiNi_{1/3}Co_{1/3}Mn_{1/3}O_2+0.25C \rightarrow 3NiO+3MnO_2+ Co_3O_4+4.5Li_2O+0.25CO_2(g)$   [Reaction Formula 1]

$4MnO_2+C \rightarrow 2Mn_2O_3+CO_2(g)$   [Reaction Formula 2]

$Li_2O+CO_2(g) \rightarrow Li_2CO_3$   [Reaction Formula 3]

First Leaching Process (S20)

In the first leaching process (S20), the raw materials containing nickel and lithium, which have undergone phase transition by the reduction heat treatment process (S10), can be leached.

The first leaching process (S20) can be performed after the reduction heat treatment process (S10). For example, the first leaching process (S20) can be carried out in a wet grinder. The wet grinder may be a ball mill, rod mill, bead mill, attrition mill, etc. The first leaching process may use a first leaching agent (e.g., inorganic acid, water, or their mixture) to selectively leach the treated lithium.

In an embodiment, the inorganic acid may be at least one selected from the group of sulfuric acid ($H_2SO_4$), hydrochloric acid (HCl), and nitric acid ($HNO_3$). Diluted inorganic acid with water may be used, and sulfuric acid produced by capturing sulfur dioxide gas generated in the subsequent roasting process (S30) can be utilized.

In an embodiment, water may be used as the first leaching agent. In such cases, lithium from the lithium-containing raw material can be leached in the form of lithium hydroxide (LiOH) through [Reaction Formula 4], producing a first leachate. The first leachate may contain lithium.

$Li_2CO_3+2H_2O \rightarrow 2LiOH+H_2O+CO_2$   [Reaction Formula 4]

In an embodiment, metals other than lithium may remain in the residue. For example, metals such as nickel (Ni), cobalt (Co), manganese (Mn), etc., may remain in the residue and be included in the first leaching residue.

The lithium concentration in the first leachate obtained from the first leaching process may be approximately 0.1 to 8.5 g/L. This leachate can be processed into lithium hydroxide monohydrate ($LiOH \cdot H_2O$), lithium carbonate ($Li_2CO_3$), lithium phosphate ($Li_3PO_4$), etc., through well-known precipitation and crystallization methods for use as raw materials in lithium-ion battery cathodes.

MHP and MCP generated in the lithium-ion battery recycling process, which may contain Li in addition to Ni, Co, Mn, can be used as the first raw material for performing the first leaching process.

First Roasting Process (S30)

A first roasting process (S30) can be performed as a preprocessing step for the second raw material.

In the first roasting process (S30), phase transition of nickel-containing raw materials bound in various compounds occurs, along with the recycling of sulfuric gas ($SO_2$ gas) generated during the thermal treatment process for the production of inorganic acids.

Before the first roasting process (S30) is carried out, the second raw material containing nickel may be in the form of a sulfide, which can be converted to an oxide by the first roasting process (S30). Leaching the nickel-containing second raw material directly in its sulfide state could result in low leaching efficiency due to the generation of hydrogen sulfide gas ($H_2S$ gas) and metal reprecipitation reactions. Therefore, by converting the compound form of the nickel-containing second raw material through the roasting process (S30) before conducting the second leaching process (S40), the leaching efficiency in the second leaching process (S40) can be improved. In this regard, the roasting process (S30) can be performed using thermal treatment equipment such as an electric furnace (Box Furnace) or a rotary kiln.

According to an embodiment of the present disclosure, the first roasting process (S30) may include loading a certain amount of nickel-containing raw material into an electric furnace, injecting sufficient oxygen ($O_2$) for the conversion to nickel oxide, and conducting roasting at 650 to 950° C. During this process, not only nickel but also other impurities can react, undergoing a phase transition through the reaction described in [Reaction Formula 5], below. Moreover, the sulfur dioxide gas generated during the first roasting process (S30) can be captured by a separate collection facility and converted to sulfuric acid ($H_2SO_4$) through mixing with water, which can then be used in subsequent leaching processes.

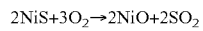     [Reaction Formula 5]

$2NiS + 3O_2 \rightarrow 2NiO + 2SO_2$

Second Leaching Process (S40)

In the second leaching process (S40), the post-roasting residue (calcine) that has undergone phase transition by the first roasting process (S30), along with the first leaching residue remaining in the residue from the first leaching process (S20), can be leached. The second leaching process (S40) can be performed after both the first roasting process (S30) and the first leaching process. In the second leaching process, the post-roasting residue can be leached in a high-temperature high-pressure reactor, while the first leaching residue can be leached in an atmospheric pressure reactor. The second leaching process (S40) can utilize a second leaching agent (e.g., inorganic acid, water, or a mixture thereof). In an embodiment, the second leaching process (S40) can be conducted using inorganic acid. For instance, at least one inorganic acid selected from the group of sulfuric acid ($H_2SO_4$), hydrochloric acid (HCl), and nitric acid ($HNO_3$), diluted inorganic acid with water, or sulfuric acid produced by capturing sulfur dioxide gas generated in the preceding first roasting process (S30) may be used.

In an embodiment, sulfuric acid can be used as a second leaching agent. In this regard, nickel can be leached from the first leaching residue and post-roasting residue containing nickel in the form of nickel sulfate ($NiSO_4$), generating a second leachate, as per [Reaction Formula 6].

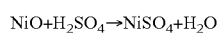     [Reaction Formula 6]

$NiO + H_2SO_4 \rightarrow NiSO_4 + H_2O$

The second leaching process (S40) can be conducted at a temperature of approximately 150 to 250° C. and a pressure of 800 to 4300 kPa. The saturation vapor pressure due to the high reaction temperature can lead to the maintenance of a certain level of pressure, and an additional pressure can be applied for a complete reaction.

For example, the second leaching process (S40) can be conducted in an environment with an acidity of 100 to 200 g/L. The second leaching process (S40) can be performed in a low pH acidic environment to secure sufficient second leachate, followed by conducting a subsequent neutralization process (S50).

In an embodiment, not only nickel but also other impurities can be leached together. For example, impurities such as iron (Fe), cobalt (Co), copper (Cu), zinc (Zn), etc., can be leached along with nickel and included in the second leachate.

The nickel concentration in the second leachate obtained from the second leaching process (S40) can be approximately 45 to 105 g/L, and the residual acidity can be 10 to 80 g/L.

Neutralization Process (S50)

In the neutralization process (S50), the second leachate produced by the second leaching process (S40) can be neutralized. The neutralization process (S50) can be performed after the second leaching process (S40).

If the second leachate is produced in a high pH environment, the volume of the second leachate produced may be reduced.

In an embodiment, after securing sufficient second leachate by conducting the second leaching process (S40) in a low pH acidic environment, the neutralization process (S50) can be performed.

In the neutralization process (S50), a neutralizing agent can be introduced to increase the pH of the second leachate generated in the second leaching process (S40). The addition of the neutralizing agent may also prepare for a subsequent purification process.

In an embodiment, the neutralizing agent may be at least one selected from the group of nickel-containing by-products (MHP, MCP), nickel hydroxide ($Ni(OH)_2$), nickel carbonate ($NiCO_3$), sodium hydroxide (NaOH), sodium carbonate ($Na_2CO_3$), calcium hydroxide ($Ca(OH)_2$), magnesium hydroxide ($Mg(OH)_2$), calcium oxide (CaO), and magnesium oxide (MgO).

The reason for using MHP and MCP as raw materials and also as neutralizing agents may be because hydroxides and carbonates generally have high solubility in acids even without roasting, which eliminates the need for processing under expensive high-temperature and high-pressure leaching conditions, and also consumes the acid ($H_2SO_4$) remaining after the second leaching process (S40), thus preparing in advance for the purification process (S60) that occurs in a high pH range.

In an embodiment, the neutralization process (S50) can use the nickel-containing by-products in the form of a moist cake. When using nickel-containing by-products, the amount of neutralizing agent added separately can be reduced, leading to cost savings. Additionally, the introduction of additional impurities can be prevented, and the concentration of nickel in the neutralized solution can be increased.

In an embodiment, the neutralization process (S50) can be performed at 80° C. under conditions of approximately pH 2 to 4.5. During this process, impurities including iron (Fe) and aluminum (Al) may precipitate and be removed.

Purification Process (S60)

In the purification process (S60), impurities contained in the neutralized solution produced by the neutralization process (S50) may be removed so that the neutralized solution can be purified. The purification process (S60) can be performed after the neutralization process (S50).

In an embodiment, the purification process (S60) may include a first purification process (S61) that may remove impurities contained in the neutralized solution produced by the neutralization process (S50); a second purification process (S62) that may remove impurities contained in the first purified solution produced by the first purification process (S61); and a third purification process (S63) that may remove impurities contained in the second purified solution produced by the second purification process (S62).

First Purification Process (S61)

In the first purification process (S61), the neutralized solution produced by the neutralization process (S50) can be purified. The neutralized solution may be the leachate that has been neutralized. The first purification process (S61) may be a process to remove impurities from the neutralized solution after the neutralization process (S50).

The first purification process (S61) may be a process that removes impurities using the precipitation method. In the first purification process (S61), impurities can be removed by a sulfide precipitation method using at least one selected from the group of sodium sulfide ($Na_2S$), sodium hydrosulfide (NaSH), ammonium hydrosulfide ($NH_4HS$), and hydrogen sulfide ($H_2S$) as a precipitant. Through this process, precipitates primarily consisting of copper sulfide (CuS) and containing impurities such as zinc, lead, and cadmium can be recovered. The precipitates can then be processed into metallic copper through solvent extraction and substitution or other purification processes.

Furthermore, in the first purification process (S61), impurities can be removed by a hydroxide precipitation method using at least one selected from the group of sodium hydroxide (NaOH), sodium carbonate ($Na_2CO_3$), calcium hydroxide ($Ca(OH)_2$), magnesium hydroxide ($Mg(OH)_2$), calcium oxide (CaO), and magnesium oxide (MgO). This process may allow for the precipitation and removal of impurities such as aluminum (Al), iron (Fe), chromium (Cr), silicon (Si), etc. The reaction may be as follows in [Reaction Formula 7] when using sodium hydrosulfide as the precipitant, and in [Reaction Formula 8] when using sodium hydroxide.

$$2CuSO_4 + 2NaSH \rightarrow Na_2SO_4 + H_2SO_4 + 2CuS\downarrow \quad \text{[Reaction Formula 7]}$$

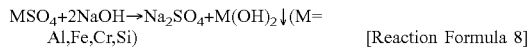

$$MSO_4 + 2NaOH \rightarrow Na_2SO_4 + M(OH)_2\downarrow \ (M=Al, Fe, Cr, Si) \quad \text{[Reaction Formula 8]}$$

During the sulfide precipitation method of the first purification process (S61), the precipitant may be introduced at an equivalent ratio of about 1.0 to 2.5 relative to the copper contained in the neutralized solution. If the sulfide precipitant is introduced at an equivalent ratio of less than 1.0 relative to copper, the copper precipitation rate may be 83% or less, indicating incomplete reaction. Upon introduction of the sulfide precipitant at an equivalent ratio exceeding 2.5, impurities originating from the precipitant may excessively enter and negatively affect the process, thus potentially lowering the recovery rate due to co-precipitation of nickel. The pH at which the reaction can be performed ranges 0.8 to 2.5 at 70° C.

In the hydroxide precipitation method of purification, the precipitant can be introduced at an equivalent ratio of about 0.8 to 1.5 relative to the impurities contained in the neutralized solution. If the hydroxide precipitant is introduced at an equivalent ratio of less than 0.8 relative to impurities, the impurity removal rate may be 85% or less, indicating incomplete reaction. Upon introduction of the precipitant at an equivalent ratio exceeding 1.5, impurities originating from the precipitant may excessively enter and negatively affect the process, potentially lowering the recovery rate due to co-precipitation of nickel. In this regard, the pH at which the reaction can be performed ranges 2.5 to 4.5 at 60° C.

After the first purification process (S61), the content of copper, iron, aluminum, and silicon in the first purified solution can be reduced to 5 mg/L or less each, and the content of zinc, cobalt, and magnesium can be reduced to 20 mg/L or less each.

Second Purification Process (S62)

The second purification process (S62) may allow further purification of the first purified solution produced by the first purification process (S61). The second purification process (S62) can be performed after the first purification process (S61) and may be a process using solvent extraction to remove impurities.

In the second purification process (S62), an organic extractant may be used to remove impurities such as zinc (Zn), magnesium (Mg), and manganese (Mn).

In an embodiment, the second purification process (S62) may include a loading process and a stripping process. Available as the organic extractant may be at least one selected from the group of di-2-ethylhexyl phosphoric acid, mono-2-ethylhexyl (2-ethylhexyl)phosphonate, and bis(2,4,4-trimethylpentyl) phosphinic acid.

The loading process may be a process for extracting impurities, such as zinc, magnesium, manganese, or a combination thereof, contained in the first purified solution into the organic phase. The loading process may be a process for extracting zinc, magnesium, and manganese contained in the first purified solution after the first purification process (S61) into an organic phase using the organic extractant.

The ratio of organic to aqueous phase in the loading process can be about 1 to 3 by volume. When the volume ratio of organic to aqueous phase is below 1, the extraction efficiency may fall 90% or less due to incomplete binding of the target metals with the organic extractant. A volume ratio of organic to aqueous phase exceeding 3 can increase the process cost due to excessive use of the organic extractant. The pH range for the loading process can be controlled to 2.0 to 4.0 using at least one selected from the group of sodium hydroxide (NaOH) or sodium carbonate ($Na_2CO_3$). In addition, the reaction temperature may be set to be 30 to 40° C.

After the extraction of zinc, magnesium, and manganese into the organic phase, phase separation due to the density difference between the organic and aqueous phases may allow for the formation of a second purified solution. The second purified solution may be an aqueous solution containing nickel which is now devoid of zinc and magnesium and may contain nickel at concentrations of 50 to 100 g/L.

The organic phase containing zinc and magnesium may undergo a stripping process. In the stripping process, inorganic acid may be added to the organic phase after the loading process, to remove the impurities. This stripping process may be a back-extraction process for pulling the zinc, magnesium, and manganese contained in the organic phase back into the aqueous phase.

The volume ratio of organic to aqueous phase in the stripping process may be about 5 to 10. When the volume ratio of organic to aqueous phase in the stripping process is below 5, water usage may increase while complete extraction of impurities is possible. When the volume ratio of organic to aqueous phase in the stripping process is above 10, the efficiency of impurity back-extraction may decrease. In the stripping process, the pH range may be controlled into approximately 0.5 to 1.5, using sulfuric acid ($H_2SO_4$). In addition, a reaction temperature may be set to be 30 to 40° C.

Third Purification Process (S63)

The third purification process (S63) may allow for further refinement of the second purified solution produced by the second purification process (S62). The third purification process (S63) may be conducted after the second purification process (S62). The third purification process (S63) may be a process for removing impurities using a solvent extraction technique. In the third purification process (S63), an organic extractant may be employed to remove impurities including cobalt. In an embodiment, the third purification process (S63) may include a loading process and a stripping process. As the organic extractant, at least one selected from the group of di-2-ethylhexyl phosphoric acid, mono-2-ethylhexyl (2-ethylhexyl) phosphonate, and bis(2,4,4-Trimethylpentyl) phosphinic acid may be used.

In the loading process, impurities containing cobalt may be extracted into an organic phase from the second purified solution. The loading process may be a process in which an organic extractant is used to extract cobalt into an organic phase from the second purified solution after the second purification process (S62).

The amount of the organic phase inputted to the loading process may be a volume ratio of approximately 1 to 3, relative to the aqueous phase. When the volume ratio of organic phase to aqueous phase is less than 1, the target metal incompletely binds to the organic extractant, with the consequent extraction rate of 90% or less. A weight ratio of organic phase to aqueous phase exceeding 3 could lead to excessive use of the organic extractant, increasing process costs. The pH range for the loading process can be controlled to between 4 and 5 using sodium hydroxide (NaOH) or sodium carbonate ($Na_2CO_3$), with the reaction temperature maintained between 30° C. and 40° C.

Once the cobalt extraction into the organic phase by mixing the aqueous phase and the organic phase is completed, the difference in specific gravity between the organic phase and the aqueous phase may allow for phase separation. This phase separation may yield a third purified solution, which is a cobalt-depleted, nickel-containing aqueous solution with a nickel content of 65 to 125 g/L.

The cobalt-containing organic phase may be subjected to a stripping process.

In the stripping process subsequent to the loading process, an inorganic acid may be added to the organic phase to remove the cobalt contained in the organic phase. The stripping process may be a back-extraction process for pulling cobalt back into the aqueous phase from the organic phase.

The volume ratio of organic to aqueous phase in the stripping process may be about 3 to 10. When the volume ratio of organic to aqueous phase in the stripping process is below 3, water usage may increase while complete extraction of impurities is possible. When the volume ratio of organic to aqueous phase in the stripping process is above 10, the efficiency of impurity back-extraction may decrease. In the stripping process, the pH range may be controlled into approximately 0.5 to 1.5, using sulfuric acid ($H_2SO_4$). In addition, a reaction temperature may be set to be 30 to 40° C.

Once the cobalt extraction into the organic phase by mixing the aqueous phase and the organic phase is completed, the difference in specific gravity between the organic phase and the aqueous phase may allow for phase separation. This phase separation may yield a cobalt-containing solution which can be further purified by precipitation and crystallization to afford high-purity cobalt sulfate.

Precipitation Process (S70)

The precipitation process (S70) may allow for the precipitation of the purified solution produced by the purification process (S60) (e.g., the third purification process (S63)). The precipitation process (S70) may be carried out following the third purification process (S63).

The precipitation process (S70) may be a process in which nickel is precipitated using a precipitation method to remove impurities. In the precipitation process (S70), at least one selected from the group of sodium hydroxide (NaOH), sodium carbonate ($Na_2CO_3$), calcium hydroxide ($Ca(OH)_2$), magnesium hydroxide ($Mg(OH)_2$), calcium oxide (CaO), and magnesium oxide (MgO) may be used as a precipitant for precipitating nickel.

When sodium carbonate is used as a precipitant, the reaction can be represented by the following Reaction Formula 9.

$NiSO_4 + 2NaOH + xH_2O \rightarrow Ni(OH)_2 + Na_2SO_4 + xH_2O$
(x≥0)      [Reaction Formula 9]

The precipitation process (S70) can be performed at a temperature of 75 to 85° C. and a pH of 6.5 to 10.0. A pH below 6.5 may result in a nickel recovery rate of less than 80%. When the pH is over 10.0, impurities attributed to the precipitant may be abundant and introduced, thus negatively affecting the process and reducing cost-effectiveness due to excessive use of the precipitant.

Impurities including sodium (Na) and potassium (K) may be partially removed during the precipitation process (S70). For instance, after the precipitation reaction, the process of recovering nickel-containing precipitates through solid-liquid separation and washing them with dilute acid and water may remove at least some of these impurities.

Second Roasting Process (S80)

In the second calcination process (S80), the precipitate residue produced by the precipitation process (S70) can be roasted. The second roasting process (S80) can be performed after the precipitation process (S70).

Before the second roasting process (S80) is performed, the precipitate residue containing nickel may be in the form of hydroxide or carbonate, and can be converted to oxide by the second roasting process (S80). The second roasting process (S80) can be carried out using heat treatment equipment such as a box furnace or rotary kiln.

According to an embodiment of the present disclosure, in the second calcination process (S80), a certain amount of nickel-containing raw material can be loaded into an electric furnace, and sufficient oxygen ($O_2$) can be injected for the conversion to nickel oxide, with roasting proceeding at 350 to 800° C. During this process, phase change may occur through Reaction Formula 10, below.

$2NiCO_3 \cdot 3Ni(OH)_2 \cdot 4H_2O + O_2 \rightarrow 5NiO + 7H_2O(g) + 2CO_2(g)$      [Reaction Formula 10]

The nickel-containing oxide produced by the present disclosure can be used as a nickel compound in powder form and, through additional processing, can be suitably used as a precursor for the nickel raw material of the cathode active material in lithium secondary batteries.

EXPERIMENTAL EXAMPLES

[Raw Materials]

As shown in Table 3, below, the elements were mixed at predetermined ratios to prepare first raw materials A to C.

TABLE 3

(unit wt %)

| | Ni | Li | Co | Cu | Fe | Zn | Mg | Al | Mn |
|---|---|---|---|---|---|---|---|---|---|
| A | 26.0 | 4.5 | 5.0 | 0.7 | 0.01 | 0.005 | 0.004 | 0.5 | 4.5 |
| B | 12.0 | 0.001 | 0.3 | 2.7 | 34.0 | 0.02 | 2.0 | 0.4 | 0.02 |
| C | 35.0 | 0.1 | 3.0 | 0.01 | 0.05 | 0.5 | 3.0 | 0.06 | 6.0 |

*Each of the first raw materials contained sulfur (S), oxygen (O), and hydrogen (H) ions in addition to the metal ions to form 100 weight %.

A second raw material was prepared to contain elements as indicated in Table 4, below.

TABLE 4

(unit wt %)

| Ni | Fe | Co | Cu | Zn | Mn | Mg | Al | S |
|---|---|---|---|---|---|---|---|---|
| 13.6 | 32.8 | 0.3 | 2.0 | 0.02 | 0.02 | 2.5 | 0.4 | 25.7 |

*The second raw material contained oxygen (O) and hydrogen (H) ions in addition to the metal ions to form 100 weight %.

[Reduction Heat Treatment Process]

A reduction heat treatment was performed on the first raw material containing nickel, lithium, etc. Specifically, 2.0 kg of the raw material was loaded into a rotary kiln and then subjected to reduction heat treatment at 850° C. for 3 hours while a reduction atmosphere was maintained using $N_2$ gas, to afford a post-reduction heat treatment residue that was converted from lithium oxide ($Li_2O$) to lithium carbonate ($Li_2CO_3$).

[First Leaching Process]

Lithium recovery was performed through water leaching of the residue after the reduction heat treatment. Specifically, 100 g of the residue was loaded into a ball mill and then ground and leached with 2.5 L of water ($H_2O$) for 2 hours. Thereafter, solid-liquid separation using vacuum filtration yielded a first leaching residue containing the elements shown in Table 5 and a first leachate containing the elements shown in Table 6 were secured.

TABLE 5

(unit wt %)

| Ni | Co | Fe | Mg | Al | Cu | Mn | Zn |
|---|---|---|---|---|---|---|---|
| 36.0 | 7.0 | 0.02 | 0.001 | 0.6 | 0.9 | 6.5 | 0.007 |

In addition to the metal ions, oxygen (O) and hydrogen (H) ions were contained to form 100 weight %.

TABLE 6

(unit g/L)

| Li | Na | Co | Fe | Mg | Al | Cu | Mn | Zn |
|---|---|---|---|---|---|---|---|---|
| 1.8 | 24.0 | 0.1 | 0.02 | 0.01 | 0.05 | 0.1 | 0.05 | 0.01 |

[First Roasting Process]

A roasting process was performed on a second raw material containing nickel and sulfur. In brief, 2 kg of the raw material was loaded into a rotary kiln and roasted at 850° C. for 3 hours while sufficiently injecting oxygen ($O_2$), to obtain roasted residue (calcine) that was converted from nickel sulfide (NiS) to nickel oxide (NiO).

[Second Leaching Process]

A raw material in which the post-reduction heat treatment residue and the post-roasting residue were mixed at a weight ratio of 2:8 was subjected to high-temperature, high-pressure leaching.

In an autoclave, a mixture of 450 g of the mixed raw materials and 3 L of water was maintained at an initial acidity of 120 g/L and a temperature of 240° C. under 3500 kPa for 3 hours to afford a second leachate with a nickel leaching rate of 95% and a nickel concentration of 60 g/L.

[Neutralization Process]

A neutralization process was performed using nickel-containing by-products in the second leachate.

By controlling the pH of 2 L of the second leachate to 2.5 with the addition of nickel-containing by-products and maintaining same at 80° C. for 3 hours, a neutralized solution with a nickel concentration of 82 g/L was secured.

[First Purification Process]

A first purification process was conducted using a precipitation method to remove impurities contained in the neutralized solution.

By adding sodium hydrosulfide (NaSH) in an amount of 1.3 equivalents (eq) of the copper (Cu) content in the neutralized solution and maintaining a pH of 2.5 at 70° C. for 2 hours, copper was removed by 99.8%. Furthermore, the neutralized solution was maintained at a pH of 4.5 for 2 hours with the nickel-containing by-products and sodium hydroxide (NaOH) to afford a first purified solution in which impurities including aluminum, iron, and silicon contained therein were removed by 99.5% or more.

[Second Purification Process]

A second purification process was carried out using a solvent extraction method to remove impurities contained in the first purified solution.

Impurities including zinc and magnesium was removed by extraction. In this regard, 500 mL of the first purified solution was mixed with 1,000 mL of 25% diluted di-2-ethylhexyl phosphoric acid as an extractant and the mixture was agitated at a pH of 3.5 at 40° C. for 10 minutes. Phase separation by specific gravity difference allowed for the extraction of zinc by 99% and magnesium by 43%. Complete extraction of impurities was possible using a counter-current exchange method in a mixer settler.

[Third Purification Process]

The third purification process was performed using a solvent extraction method to remove cobalt contained in the second purified solution.

A mixture of 500 mL of cobalt-containing second purified solution and 1,000 mL of 25% diluted bis(2,4,4-trimethylpentyl) phosphinic acid as an extractant was agitated at a pH of 5.0 at 40° C. for 10 minutes, and phase separation by specific gravity difference allowed for the extraction of cobalt by about 55%. Complete extraction of impurities was possible using a counter-current exchange method in a mixer settler.

This process allowed for the removal of cobalt to the level of 3 mg/L or less to afford a post-third purification solution containing the elements given in Table 7, below.

TABLE 7

| | | | (unit mg/L) | | | | |
|---|---|---|---|---|---|---|---|
| Ni | Co | Fe | Mg | Al | Cu | Mn | Zn |
| 58 g/L | 2.5 | 0.01 | 0.2 | 0.01 | 0.01 | 0.05 | 0.001 |

[Precipitation Process]

A precipitation process was conducted to recover nickel contained in the third purified solution into a precipitate form.

Using sodium carbonate ($Na_2CO_3$), the pH was maintained at 8.0 at 85° C. for 2 hours for 1 L of the third refined solution containing 42 g/L of nickel. Solid-liquid separation using vacuum filtration was carried out, followed by rinsing with 1 L of distilled water (DIW) to afford precipitate residue containing elements shown in Table 8.

TABLE 8

| | | | (unit wt %) | | | | |
|---|---|---|---|---|---|---|---|
| Ni | Co | Fe | Mg | Al | Cu | Mn | Zn |
| 43 | 0.01 | 0.01 | 5.0 | 0.01 | 0.01 | 0.7 | 0.01 |

[Second Roasting Process]

To convert the nickel contained in the precipitate residue from hydroxide or carbonate form to oxide form, the second roasting process was carried out.

Specifically, 2 kg of raw material was charged in a rotary kiln, and with sufficient oxygen ($O_2$) injection, the material was roasted at 400° C. for 3 hours to convert from nickel hydroxide ($Ni(OH)_2$) or carbonate ($NiCO_3$) form to nickel oxide (NiO) form, and nickel oxide containing the elements listed in Table 9 below was obtained.

TABLE 9

| | | | (unit wt %) | | | | |
|---|---|---|---|---|---|---|---|
| Ni | Co | Fe | Mg | Al | Cu | Mn | Zn |
| 70 | 0.13 | 0.01 | 1.6 | 0.01 | 0.01 | 0.03 | 0.01 |

Although the embodiments of the present disclosure have been described with reference to the accompanying drawings, those skilled in the art to which the present disclosure pertains will be able to understand that the embodiments can be implemented in other specific forms without changing the technical spirit or essential features of the present disclosure.

Therefore, it should be understood that the embodiments described above are exemplary and not limitative in all respects. The scope of the present disclosure is defined by the claims rather than the detailed description. It should be construed that all changes or modified forms derived from the meaning and scope of the claims and equivalent concepts thereof are included in the scope of the present disclosure.

What is claimed is:

1. A nickel recovering method, comprising:
   (A-i) a reduction heat treatment process for thermally treating a first raw material containing nickel and lithium;
   (B) a first leaching process for leaching the heat-treated product produced by the reduction heat treatment process;
   (A-ii) a first roasting process for thermally treating a second raw material containing nickel and sulfur;
   (C) a second leaching process for leaching the first leaching residue produced by the first leaching process and calcine produced by the roasting process;
   (D) a neutralization process for neutralizing the second leachate produced by the second leaching process;
   (E) a purification process for removing impurities contained in the neutralized solution produced by the neutralization process;
   (F) a precipitation process for performing precipitation on the purified solution produced by the purification process; and
   (G) a second roasting process for roasting the precipitated residue produced by the precipitation process to recover nickel.

2. The nickel recovering method of claim 1, wherein the first raw material and the second raw material each independently comprises at least one selected from the group of an oxide, a hydroxide, a sulfide, and a sulfur oxide, the oxide, hydroxide, sulfide, and sulfur oxide each independently containing ore, matte, black mass (BM), black powder (BP), mixed hydroxide precipitate (MHP), mixed carbonate precipitate (MCP), mixed sulfide precipitate (MSP), or a mixture thereof.

3. The nickel recovering method of claim 1, wherein the first raw material comprises nickel in a form of nickel oxide or nickel metal composite oxide.

4. The nickel recovering method of claim 1, wherein the second raw material comprises nickel in a form of nickel sulfide.

5. The nickel recovering method of claim 1, wherein the reduction heat-treatment process is carried out at 650 to 950° C. in a manner of introducing the first raw material into a thermal treatment equipment and injecting nitrogen gas.

6. The nickel recovering method of claim 1, wherein the first leaching process is carried out using a first leaching agent including an inorganic acid, water, or a mixture thereof.

7. The nickel recovering method of claim 1, wherein the first leachate obtained by the first leaching process contains lithium and the first leaching residue contains nickel.

8. The nickel recovering method of claim 1, wherein the first roasting process is carried out at 650 to 950° C. in a manner of introducing the second raw material into a thermal treatment equipment and injecting oxygen gas.

9. The nickel recovering method of claim 1, wherein, in the second leaching process, the first leaching residue and the calcine are leached in an atmospheric reactor and a high-temperature, high-pressure reactor, respectively.

10. The nickel recovering method of claim 1, wherein the second leaching process is carried out using a second leaching agent including an inorganic acid, water, or a mixture thereof.

11. The nickel recovering method of claim 1, wherein the second leaching process is carried out at a temperature of 150 to 250° C. under a pressure of 800 to 4300 kPa.

12. The nickel recovering method of claim 1, wherein the second leaching process is carried out in an environment with an acidity of 100 to 200 g/L.

13. The nickel recovering method of claim 1, wherein the neutralizing process is carried out using a neutralizing agent including MHP, MCP, nickel hydroxide ($Ni(OH)_2$), nickel carbonate ($NiCO_3$), sodium hydroxide (NaOH), sodium carbonate ($Na_2CO_3$), calcium hydroxide ($Ca(OH)_2$), magnesium hydroxide ($Mg(OH)_2$), calcium oxide (CaO), magnesium oxide (MgO), or a mixture thereof.

14. The nickel recovering method of claim 1, wherein the neutralizing process is carried out at 80° C. under conditions of a pH of 2 to 4.5.

15. The nickel recovering method of claim 1, wherein the purification process comprises:
- (E-i) a first purification process for removing impurities contained in the neutralized solution produced by the neutralization process;
- (E-ii) a second purification process for removing impurities contained in a first purified solution produced by the first purification process; and
- (E-iii) a third purification process for removing impurities contained in a second purified solution produced by the second purification process.

16. The nickel recovering method of claim 15, wherein the first purification process removes impurities including copper, iron, aluminum, silicon, zinc, cobalt, magnesium, or a combination thereof, using a precipitation method.

17. The nickel recovering method of claim 15, wherein the first purification process is carried out using (i) a sulfide precipitation process of adding a sulfide precipitating agent to the neutralized solution at a content of 1.0 to 2.5 equivalents of a copper content in the neutralized solution, (ii) a hydroxide precipitation process of adding a hydroxide precipitating agent to the neutralized solution at a content of 0.8 to 1.5 equivalents of an impurity content in the neutralized solution, or a combination of (i) and (ii).

18. The nickel recovering method of claim 15, wherein the second purification process removes impurities including zinc, magnesium, manganese, or a combination thereof, using a solvent extraction method.

19. The nickel recovering method of claim 15, wherein the second purification process is carried out using (i) a loading process of adding a first solvent extractant to the first purified solution to extract impurities including zinc, magnesium, manganese, or a combination thereof into an organic phase, and (ii) a stripping process of adding an inorganic acid to the organic phase to extract impurities including zinc, magnesium, manganese, or a combination thereof, contained in the organic phase, into an aqueous phase.

20. The nickel recovering method of claim 15, wherein the third purification process removes impurities including cobalt, using a solvent extraction method.

21. The nickel recovering method of claim 15, wherein the third purification process comprises (i) a loading process of adding a second solvent extractant to the second purified solution to extract impurities including cobalt into an organic phase, and (ii) a stripping process of adding an inorganic acid to the organic phase to extract impurities including cobalt, contained in the organic phase, into an aqueous phase.

22. The nickel recovering method of claim 1, wherein the precipitation process is carried out using a precipitating agent including sodium hydroxide (NaOH), sodium carbonate ($Na_2CO_3$), calcium hydroxide ($Ca(OH)_2$), magnesium hydroxide ($Mg(OH)_2$), calcium oxide (CaO), magnesium oxide (MgO), or a mixture thereof.

23. The nickel recovering method of claim 1, wherein the precipitation process is carried out at 85° C. in a condition of a pH of 6.5 to 10.0.

24. The nickel recovering method of claim 1, wherein the second roasting process is carried out at 350 to 800° C. in a manner of introducing the precipitated residue into a thermal treatment equipment and injecting oxygen gas.

* * * * *